(12) United States Patent
Beadle et al.

(10) Patent No.: US 6,637,025 B1
(45) Date of Patent: Oct. 21, 2003

(54) DYNAMIC SELECTION/DEFINITION OF WHICH CLASS/METHODS SHOULD OR SHOULD NOT BE JIT'ED USING INFORMATION STORED IN A JAR FILE

(75) Inventors: Bruce Anthony Beadle, Round Rock, TX (US); Michael Wayne Brown, Georgetown, TX (US); Michael Anthony Paolini, Austin, TX (US); Douglas Scott Rothert, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,975

(22) Filed: Dec. 3, 1998

(51) Int. Cl.$^7$ ................................................ G06F 9/45
(52) U.S. Cl. ...................................... 717/148; 717/151
(58) Field of Search .............................. 717/3, 148, 151

(56) References Cited

U.S. PATENT DOCUMENTS

| | | | | |
|---|---|---|---|---|
| 5,414,855 A | * | 5/1995 | West ............................ | 717/7 |
| 5,560,013 A | * | 9/1996 | Scalzi et al. .................... | 717/7 |
| 5,835,773 A | * | 11/1998 | Dunn ............................ | 717/5 |
| 5,838,978 A | * | 11/1998 | Buzbee .......................... | 717/5 |
| 5,920,720 A | * | 7/1999 | Toutonghi et al. .............. | 717/5 |
| 5,978,585 A | * | 11/1999 | Crelier .......................... | 717/5 |
| 6,078,744 A | * | 6/2000 | Wolczko et al. ................ | 717/5 |
| 6,081,665 A | * | 6/2000 | Nilsen et al. .................. | 717/116 |
| 6,093,216 A | * | 7/2000 | Adl-Tabatabai et al. ........ | 717/3 |
| 6,110,226 A | * | 8/2000 | Bothner .......................... | 717/7 |
| 6,115,719 A | * | 9/2000 | Purdy et al. .................... | 707/13 |
| 6,118,940 A | * | 9/2000 | Alexander, III et al. .... | 717/127 |
| 6,131,191 A | * | 10/2000 | Cierniak et al. ............. | 717/148 |
| 6,139,199 A | * | 10/2000 | Rodriguez .................... | 717/159 |
| 6,141,794 A | * | 10/2000 | Dice et al. .................... | 717/118 |
| 6,151,703 A | * | 11/2000 | Crelier .......................... | 717/5 |
| 6,233,725 B1 | * | 5/2001 | Beadle et al. ................ | 717/118 |
| 6,289,504 B1 | * | 9/2001 | Cierniak et al. ............. | 717/148 |
| 6,289,506 B1 | * | 9/2001 | Kwong et al. ............... | 717/148 |
| 6,295,641 B1 | * | 9/2001 | Beadle et al. ................ | 717/148 |
| 6,295,642 B1 | * | 9/2001 | Blandy ......................... | 717/148 |
| 6,298,477 B1 | * | 10/2001 | Kessler ....................... | 717/145 |
| 6,324,686 B1 | * | 11/2001 | Komatsu et al. ............ | 717/148 |
| 6,324,687 B1 | * | 11/2001 | Beadle et al. ................ | 717/148 |

OTHER PUBLICATIONS

"JavaSoft Announces JDK 1.1, Including Stringent Compatibility Tests", Press Release Sun MicroSystems Inc. Dec. 3, 1996.*
"Sun Ships JDK 1.1—Javabeans Included", Press Release, Feb. 19, 1997.*
U.S. Trademark Electronic Search System (TESS) The registration of the Trademark JAVA (74,631,225) Filed Feb. 7, 1995, Nov. 11, 2001.*
U.S. Trademark Electronic Search System (TESS) The registration of the Trademark JDK (75,695,723) Filed Apr. 30, 1999, Nov. 11, 2001.*

(List continued on next page.)

*Primary Examiner*—Tod Ingberg
(74) *Attorney, Agent, or Firm*—Duke W. Yee; Jeffrey S. LaBaw; Michael R. Nichols (57) ABSTRACT

The present invention provides a process in a data processing system for executing bytecodes. The bytecodes are contained in a JAVA archive file along with just in time compiling instructions. A call to just in time compile bytecodes is intercepted in which the bytecodes should not be JIT'ed. A means is provided within the JAVA archive file for software developers to mark as 'no JIT' some classes/methods in the field. Conversely, means is provided within the JAVA archive file for software developers to mark as 'JIT' some classes/methods in the field. Only the selected bytecodes are sent to the interpreter for processing rather than all of the classes.

45 Claims, 3 Drawing Sheets

OTHER PUBLICATIONS

"Efficent Implementation of the Smalltalk–80 System", L. Peter Deutsch et al. Xerox PARC, Software Concepts Group ACM 13 pages, 1984.*

"Advanced Compiler Design & Implementation", Steven Muchnick pp. 127–134, Aug. 19, 1997.*

"The JAVA Archive (JAR) File" Sun Micro Systems website of intended use. Released in JDK1.1 Dec. 3, 1996 14 pages, Nov. 8, 2001.*

"Compiling JAVA Just In Time", Timothy Cramer et al. IEEE Micro pp. 26–43, May 1997.*

"Compiling the Example Program", Sun Micro Systems website on how to compile a program with a JARfile, Jun. 13, 2001.*

"Visual Cafe for JAVA Database Development Edition", William Brogden et al. pp. 218, 219, 518, 519, Jan. 28, 1998.*

"The JAVA Factor" Communications of ACM, by Sandeep Singhal et al. vol. 41, No. 6 pp. 34, 36, 37, Jun. 1998.*

"The JIT Compiler API", Frank Yellin, pp. 1–23, Jun. 1996.*

"The JAVA Native Code API", Frank Yellin, pp. 1–21, Jul. 1996.*

"Java!", Tim Richey, chapters 1–2, 14, New Riders Publishing Tommorrow's Realities, Sep. 22, 1995.*

"Design, Implementation, and Evaluation of Optimizations in Just—In–Time Compilers", IBM Japan, No Date.*

"Latte: A Fast and Efficient Java VM Just–In–Time Compiler" Seoul National University, Mass Laboritiy, 1999.*

"The Jalapeno Dynamic Optimizing Compiler for JAVA", M. Burke et al., IBM Research Center, No Date.*

"Java Unleashed", Michael Morrison et al. Sams Macmillan Computer Publishing, Chapter 39, Apr. 12, 1996.*

"IBM Visual Age for Java, version 2.0" Getting started by IBM manual # S430–4086–01, 1997.*

"Java on Solaris 2.6 a white paper" Sun Soft, pp. 1–50. Sep. 1997.*

"IBM Visual Age for Java—Fixes Available" IBM Corporation http://www–4.ibm.com/software/ad/vajava/fixes.html, Dec. 28, 2000.*

IBM Netscape and Sun Collaborate to Speed Performance, Compatibility and Deployment of the Java Platform, Sun Press, Aug. 26 1997.*

Michael P. Plezbert and Ron K. Cytron, "Does 'Just in Time' = 'Better Late than Never'?," *24th Annual SIGPLAN–SIGACT Symposium on Principles of Programming Languages*, Paris, France, Jan. 15–17, 1997, pp. 120–131.

* cited by examiner

| CLASS/METHOD A | JIT | ~602 |
| CLASS/METHOD B | NO JIT | ~604 |
| CLASS/METHOD C | JIT | ~606 |
| CLASS/METHOD D | NO JIT | ~608 |
| CLASS/METHOD E | NO JIT | ~610 |
| CLASS/METHOD F | JIT | ~612 |

DYNAMIC SELECTION/DEFINITION OF WHICH CLASS/METHODS SHOULD OR SHOULD NOT BE JIT'ED USING INFORMATION STORED IN A JAR FILE

CROSS REFERENCE TO RELATED APPLICATIONS

The present invention is related to applications entitled A Method And Apparatus To Coordinate And Control The Simultaneous Use Of Multiple Just In Time Compilers With A Java Virtual Machine, U.S. patent application Ser. No. 09/204,513, no U.S. Pat. No. 6,233,725; A Method And Apparatus To Selectively Control Processing Of A Method In A Java Virtual Machine, U.S. patent application Ser. No. 09/204,512, now U.S. Pat. No. 6,324,687; Method And Apparatus For Automatic Service Of JIT Compiler Generated Errors, U.S. patent application Ser. No. 09/204,511, now U.S. Pat. No. 6,321,377; Method And Apparatus For Dynamically Selecting Bytecodes For Just In Time Compiling In A User's Environment, U.S. patent application Ser. No. 09/204,976, now U.S. Pat. No. 6,295,641; A Method And Apparatus For Dynamic Selection Of Which Bytecodes Should Be Just In Time Compiled, U.S. patent application Ser. No. 09/204,519, now U.S. Pat. No. 6,336,213; JIT/Compiler Java Language Extensions To Enable Field Performance and Serviceability, U.S. patent application Ser. No. 09/204,968, currently pending; and Method And Apparatus For Dynamic Selection Of Instructions For Compiling Using Tags, U.S. patent application Ser. No. 09/204,516, now U.S. Pat. No. 6,305,012, all of which are filed even data hereof, assigned to the same assignee, and incorporated herein by reference.

BACKGROUND OF THE INVENTION

1. Technical Field

The present invention relates generally to an improved data processing system and in particular to an improved method and apparatus for processing a method in a Java Virtual Machine. Still more particularly, the present invention relates to a method and apparatus for dynamically selecting methods for just in time compiling.

2. Description of Related Art

JAVA, a trademark of Sun Microsystems, Inc., is an object-oriented programming language and environment focusing on defining data as objects and the methods that may be applied to those objects. JAVA is designed to solve a number of problems in modern programming practice. JAVA is able to support applications for many types of data processing systems, which may contain a variety of central processing units and operating systems architectures. To enable a JAVA application to execute on different types of data processing systems, a compiler typically generates an architecture-neutral file format—the compiled code is executable on many processors, given the presence of the JAVA runtime system. The JAVA compiler generates bytecode instructions that are non-specific to a particular computer architecture. A bytecode is a machine independent code generated by the JAVA compiler and executed by a JAVA interpreter. A JAVA interpreter is a module that alternately decodes and executes a bytecode. The decoding of the bytecode places the instruction into an executable form for the computer on which the code is to be executed. Then, the instruction is executed by the computer. These bytecode instructions are designed to be easy to interpret on any machine and easily translated on the fly into native machine code.

The JAVA Virtual Machine (JVM) is a virtual computer component that resides only in memory. A JVM includes components necessary to run a program on a computer, including an interpreter. The JVM allows JAVA programs to be executed on different platforms as opposed to only the one platform for which the code was compiled. JAVA programs are compiled for the JVM. In this manner, JAVA is able to support applications for many types of data processing systems, which may contain a variety of central processing units and operating systems architectures. To enable a JAVA application to execute on different types of data processing systems, a compiler typically generates an architecture-neutral file format—the compiled code is executable on many processors, given the presence of the JAVA runtime system. The JAVA compiler generates bytecode instructions that are non-specific to a particular computer architecture. A bytecode is a machine independent code generated by the JAVA compiler and executed by a JAVA interpreter.

In performance critical environments, sometimes it is necessary to rely on specialized just in time (JIT) compilers to generate different just in time compiled code for different circumstances. For example, some just in time compilers are optimized for processing loops in bytecodes. In other instances, some just in time compilers may cause errors or unpredictable results in compiling bytecodes into code for use on the client computer. Currently, this problem is resolved by changing the JAVA code itself and recompiling to code around the JIT compile problems, servicing the JIT compiler itself or disabling the JIT compiler for the virtual machine (VM), thereby reducing performance by causing all classes to be passed to the interpreter.

Whenever a JIT compiler causes errors in compiling a class or the overhead for JIT'ing reduces the performance of the application, it would be advantageous to have a methodology to not JIT compile some classes/methods. Further, because changing the JAVA code itself and recompiling to code around the JIT compilation problems, servicing the JIT compile itself requires expertise above that of a software developer in the field and still further because 'quick fixes' available to the software developer such as disabling the just in time compiler reduce the application performance even more, it would be advantageous to give software distributors control over which classes or methods get just in time compiled (JIT'ed) in the field.

SUMMARY OF THE INVENTION

The present invention provides a process in a data processing system for executing bytecodes. The bytecodes are contained in a JAVA archive file along with just in time compiling instructions. A call to just in time compile bytecodes is intercepted in which the bytecodes should not be JIT'ed. A means is provided within the JAVA archive file for software developers to mark as 'no JIT' some classes/methods in the field. Conversely, means is provided within the Java archive file for software developers to mark as 'JIT' some classes/methods in the field. Only the selected bytecodes are sent to the interpreter for processing rather than all of the classes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
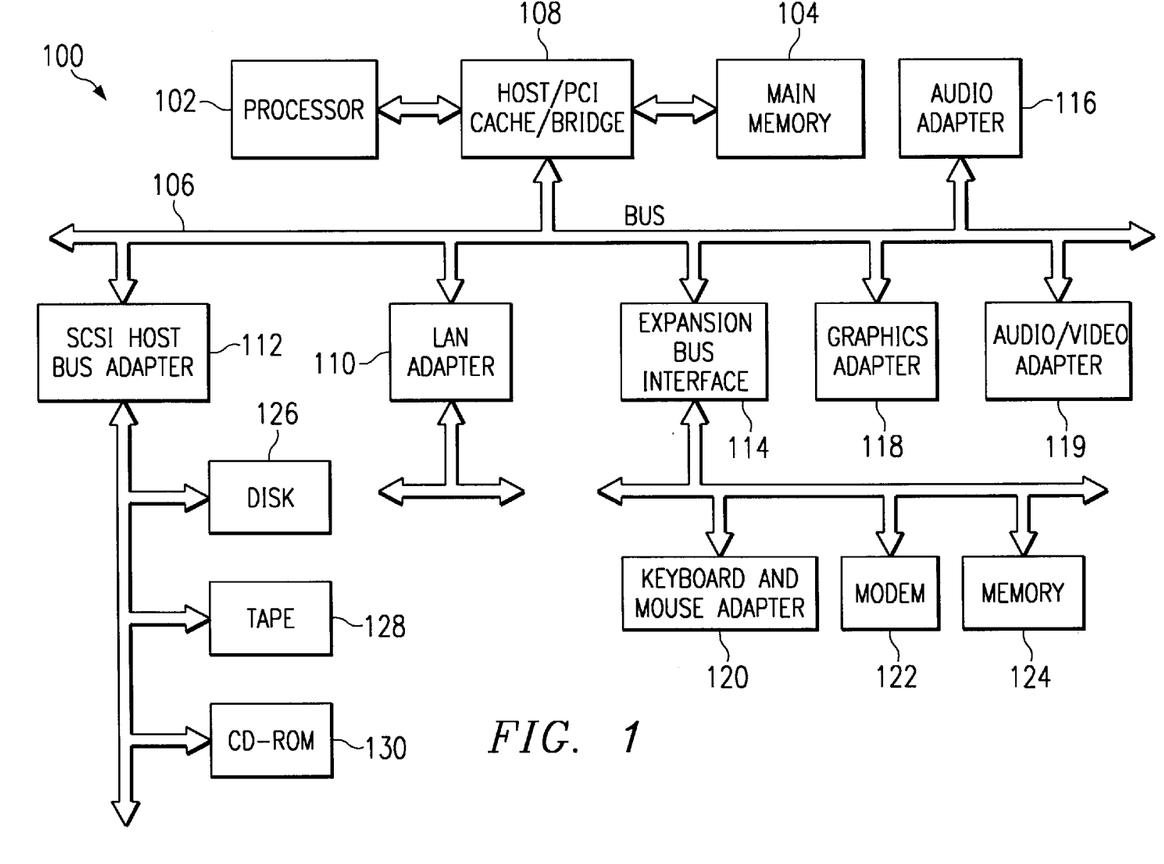
FIG. 1 is a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130, in the depicted example. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as JAVA may run in conjunction with the operating system and provides calls to the operating system from JAVA programs or applications executing on data processing system 100. Instructions for the operating system, the object-oriented operating system, and applications or programs are located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing systems.

The present invention provides a method, apparatus, and instructions for introducing the concept of allowing a software distributor to selectively choose which Java classes should and should not be JIT'ed in the field. In a preferred embodiment of the present invention, this selection is made using a new JAVA archive (JAR) file packaging option.

In a preferred embodiment of the present invention a software developer enters JIT'ing instructions to the contents of a JAR file. An interface identifies whether the just in time compiler should compile a particular method or class based on JIT'ing instructions contained in the JAR file which relate to that method or class. Rather than re-writing JAVA code and recompiling the method or class, or servicing the JIT compiler itself, the developer merely selects which classes should or should not be JIT'ed and passes them to the interpreter or JIT compiler. The developer repackages JAVA classes which have errors after just in time (JIT'ing) compiling or have been performance optimized by including JIT'ing instructions in the JAR. The JIT'ing instructions could be included in tables or lists of classes which should or should not be JIT'ed, or could be included in an extended class file.

Figure 7:
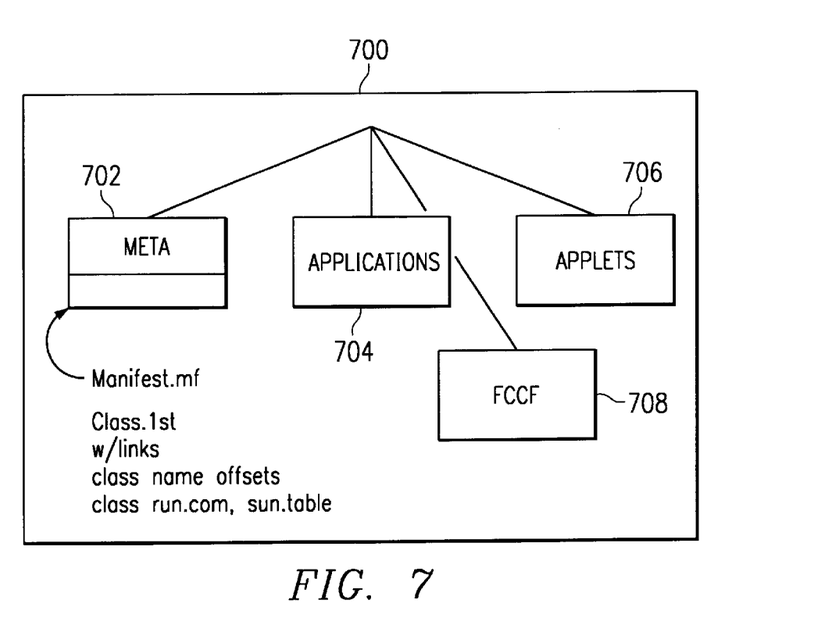

FIG. 7 illustrates the structure of a typical JAVA archive (JAR). JAR files are a new feature introduced in JAVA DEVELOPER's KIT (JDK) 1.1. JDK is a trademark of Sun Microsystems, Inc. for development software associated with the JAVA language.

JAR files are simple, uncompressed file archives. JAR files provide compression, backward compatibility with existing JAVA applets, portability, and security features. JAR files are a new distribution format for JAVA applets and provides an attribute of the APPLET tag for instructing the browsers to pre-load a JAR archive. By affixing a digital signature to a JAR archive, an applet author can provide verifiable evidence that he or she is, indeed, the author of the applet. Because JAR archives preserve the directory hierarchy of their files, and because they can be loaded through a simple change to the APPLET tag, JAR archives can be used transparently with existing Java applets with no change to the applet code.

One entry in JAR file 700 is a collection of META-information about the archive, which is collected in manifest file 702. Manifest file 702 lists information about classes contained in JAR file 700. Typically JAR 700 includes applications 704 and/or applets 706. In addition to application 704 or applet 706 classes, information related to compiling a class or method can be added to the JAR file 700. Information related to just in time compiling can be included in the JAR file. Three options follow:

The first is to define a new name:value pair in manifest file 702. One example is to include information in the manifest file that class xxx should always be JIT'ed by setting the value of the new pair, e.g. a boolean named JIT_option, to True. Below is an example of an entry in manifest file 702.

Name: com/ibm/java/xxx/xxx.class

Digest-Algorithms: SHA MD5

SHA-Digest: h5monN4JmkYO2r3LxdXoT7CBg4w=

MD5-Digest: FZkHYgnpoNR+Q3uWKbDukw==

JIT_option: True

Another example is to include information in the manifest file as to where a file containing JIT'ing information related to class xxx is located. Below is an example of an entry in manifest file 702.

Name: com/ibm/java/xxx/xxx.class

Digest-Algorithms: SHA MD5

SHA-Digest: h5monN4JmkYO2r3LxdXoT7CBg4w=

MD5-Digest: FZkHYgnpoNR+Q3uWKbDukw==

JIT_option-file:com/ibm/java/xxx.JIT

The second is by putting a flat file, containing JIT'ing information and having a known filename, into a known directory. An example is to put a flat file, such as xxx.JIT, into directory META-inf, which also contains manifest file 702.

Fully caffeinated class (FCCF) file 710, is another example. FCCF 710 is an extended class file containing extra information about the class. The extra information in an FCCF file may include JIT'ing instructions or point to a flat file containing JIT'ing instruction.

A final option is by using a .JIT extension. By placing a file xxx.JIT containing JIT'ing instructions in the same directory as xxx.class, the JIT'ing instructions are available with the class. For instance JIT'ing options for java/lang/xxx.class is available by merely using the .JIT extension, java/lang/xxx.JIT, when JIT information is stored in the same directory as the class xxx.

The present invention allows for repackaging of JAVA classes and methods to be serviced or performance tuned in the field without having to be recompiled through he use of JAR files. An example of this utility is where third party binaries have licensed and shipped in the JAR.

The JAVA interface takes the JIT'ing instructions contained in one of the three options discussed above and makes a record in the data structure for future invocations of the class or method. Thereafter, whenever one of those classes or methods is invoked, the data structure contains the information necessary for determining if a class or method should be JIT'ed or passed to the interpreter. In this manner, a JIT compiler may be specified for particular methods or classes in which errors do not occur. Conversely, if JIT'ing a class results in errors from faulty logic in a JIT compiler, the class should not be JIT'ed but passed to the interpreter. Instead of servicing the JIT compiler or disabling the JIT compiler for the JVM, the software distributor merely includes in the JAR, a file which marks the class 'no JIT'. Conversely, classes or methods which should always be just in time compiled are marked, 'JIT'.

Figures 2, 3, 4:
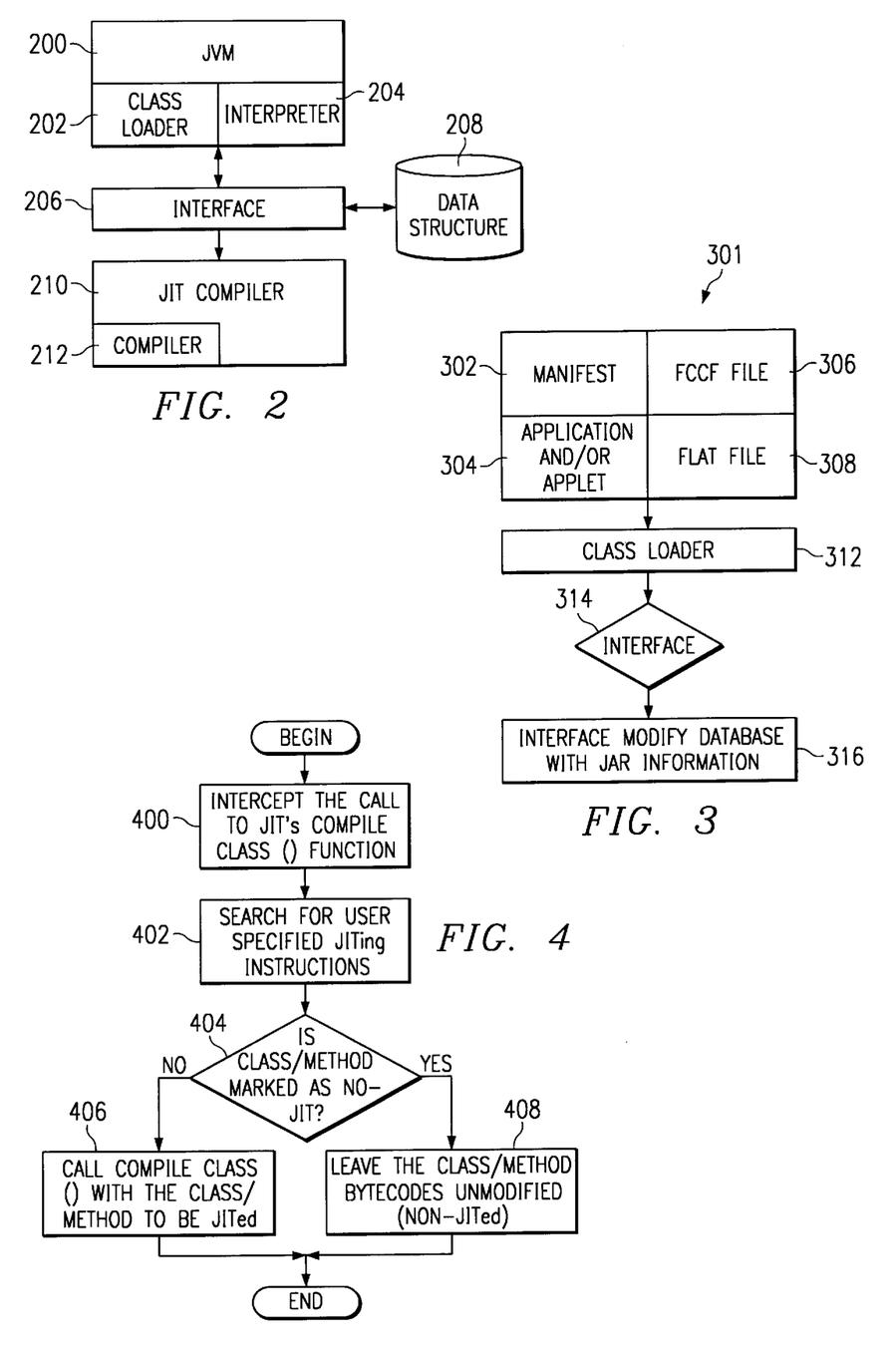
FIG. 2 is a diagram of components used to selectively process methods in accordance with a preferred embodiment of the present invention.
FIG. 3 illustrates the process for modifying a database with lists and tables included in a JAR file.
FIG. 4 is a flowchart of a process used to determine whether a method should be just in time compiled is depicted in accordance with a preferred embodiment of the present invention.

With reference now to FIG. 2, a diagram of components used to selectively process methods is depicted in accordance with a preferred embodiment of the present invention. In this example, JVM 200 includes a ClassLoader 202 and interpreter 204. ClassLoader 202, interface 206 and data structure 208 are the components containing the mechanism and process of the present invention. Data structure 208 is used by interface 206 to determine whether or not to just in time compile a method. Also shown in FIG. 2 is JIT compiler 210, which includes compiler unit 212. JVM 200 and JIT compiler 210 contain other components, which are not shown, to avoid obscuring the description of the present invention.

JVM 200 will start execution by invoking a method of a specified class or applet. In the depicted example, this method, for example, is main. The method may be passed by a single argument in the form of an array of strings. This causes the specified class to be loaded, linked to other types that it uses, and initialized. The loading of a class involves finding the binary form of a class or interface type with a particular name. In the depicted example, the loading process is implemented by ClassLoader 202. ClassLoader 202, in this example, includes a ClassLoader class, which includes methods for loading new classes into the JAVA runtime environment. ClassLoader 202 may be modified to support extension classes or files containing special instructions for not JIT'ing certain classes or methods. ClassLoader 202 passes the extensions and files to interface 206. The file extensions and class extensions containing the 'no JIT' lists and tables are transferred, or otherwise used to edit data structure 208. Interpreter 204 is a program that translates a bytecode into an instruction and then executes the instruction. The bytecode is translated into an instruction executable by the computer on which the JVM is located.

Compiler unit 212 incorporates a compiler class, which includes methods for compiling methods to native instructions prior to execution. In this example, the compilation by compiler 212 occurs only once per method. Some JIT compilers may compile entire classes, rather than one method at a time. A specific class or method may be compiled by passing an instance of the method or class to a compiler unit, such as compiler 212 in JIT compiler 210.

Interface 206 receives the call or passing of the method destined for JIT compiler 210. Interface 206 may receive or intercept the method being passed to JIT compiler 210 by registering itself as a JIT compiler that is to receive the method from JVM 200 in place of JIT compiler 210. The method is received from JVM 200 by interface 206 through a compile class API invoked by interpreter 204 in JVM 200. Interface 206 takes the method information received from ClassLoader 202 and determines whether to JIT compile the method.

This determination may be made by comparing the method name to a list or table of methods in data structure 208, which contains information about methods, classes, and/or bytecode patterns, along with JIT or not JIT information for specific classes, methods, and/or bytecode patterns. Alternatively, the class name or bytecode patterns may be used to determine whether or not to send the method to the JIT compiler. The method is then either passed on to JIT compiler 210. Alternatively, interface 206 may place a call to have interpreter 204 interpret the method, or processing of the method may be terminated.

FIG. 3 is a flowchart of the process for modifying the list or table in data structure 208. Initially, an applet or application with classes or methods is to be compiled in JIT compiler 212. However, because compiling errors may have occurred after JIT'ing certain JAVA bytecodes, it might be necessary to only JIT selected classes or methods. Also, the performance of a JAVA applet or application is not always faster if all classes and methods are JIT'ed due to the overhead associated with JIT'ing code that is seldom used. So the developer repackages JAVA classes, which have errors after JIT'ing or have been performance optimized, by including JIT'ing instructions in the JAR.

JAR file 301 is passed to ClassLoader 312 which opens the JAR file. In this example, ClassLoader 312 is modified to support JAR format as well as other formats such as class files FCCF extensions. The JIT'ing information is included in JAR file 301 with one of the three options discussed above. Using manifest file 302, ClassLoader 312 locates all classes associated with the application to be compiled including methods and the associated flat files which contain JIT'ing option information.

In one embodiment, interface 314 takes the method and JIT'ing information contained in flat file 308, which was received from ClassLoader 312, and determines whether to JIT compile the method. Interface 314 compares the JIT'ing information received from ClassLoader 312, to the JIT'ing list or table of methods in data structure 208, which contains information about methods, classes, and/or bytecode patterns, along with JIT or no JIT information for specific classes, methods, and/or bytecode patterns. If the JIT'ing information form ClassLoader 312 agrees with the JIT'ing information contained in data structure 208, no action is needed. If, on the other hand, the JIT'ing information from ClassLoader 312 disagrees with the JIT'ing information contained in data structure 208, the JIT'ing information contained in data structure 208 is updated to reflect the JIT'ing information passed from ClassLoader 312.

Alternatively, ClassLoader 312 passes FCCF file 306 indicating the bytecodes that are to remain unJIT'ed, to interface 314. Again, if the JIT'ing information from ClassLoader 312 disagrees with the JIT'ing information contained in data structure 208, the JIT'ing information contained in data structure 208 is updated to reflect the JIT'ing information passed from class loader 312.

In other embodiments ClassLoader 312 passes JIT'ing options obtained from manifest file 302, indicating the bytecodes that are to remain unJIT'ed, to interface 314. Again, if the JIT'ing information from ClassLoader 312 disagrees with the JIT'ing information contained in data structure 208, the JIT'ing information contained in data structure 208 is updated to reflect the JIT'ing information passed from ClassLoader 312.

With reference now to FIG. 4, a flowchart of a process used to determine whether a method should be just in time compiled is depicted in accordance with a preferred embodiment of the present invention. The process begins by intercepting a call to the JIT compiler's compile class function (step 400). Thereafter, a search is made for user-specified data for a particular class/method (step 402). This search may be made in a data structure containing information about various classes or methods. In particular, the information identifies methods that produce invalid results or errors when compiled by JIT compiler. The information may be targeted to specific JIT compilers.

Figure 6:
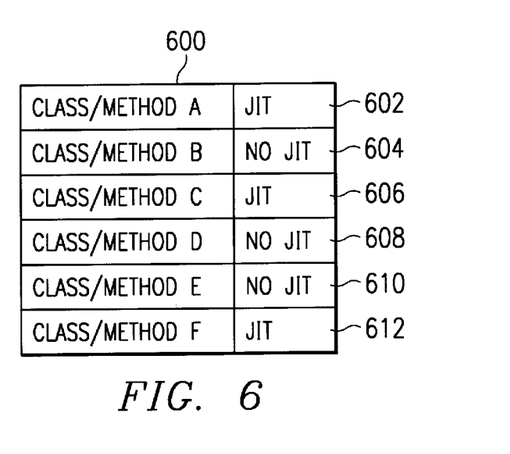
FIG. 6 is an example of a data structure containing user specified data for class/method information in accordance with a preferred embodiment of the present invention; and, FIG. 7 illustrates the structure of a typical JAVA archive (JAR).

In FIG. 6, an example of a data structure containing user-specified data for class/method information is depicted in accordance with a preferred embodiment of the present invention. Data structure 600 includes a number of entries 602–612 in which each entry identifies a class/method and an indication as to whether the method is to be JIT'ed or not JIT'ed. A "no-JIT", such as that found in entry 604 for class/method B, indicates that the method should not be JIT'ed. A determination is then made as to whether the class/method has been marked as no JIT (step 404). This determination is made by comparing the method to be JIT'ed to data within a data structure, such as data structure 600 in FIG. 6. If the class/method is not to be JIT'ed, then the class/method bytecodes are unmodified (step 406) with the process terminating thereafter. These bytecodes may then be sent to the interpreter for execution. Otherwise, the class/method to be JIT'ed is sent to the JIT compiler by calling compile class (step 408), with the process terminating thereafter.

Figure 5:
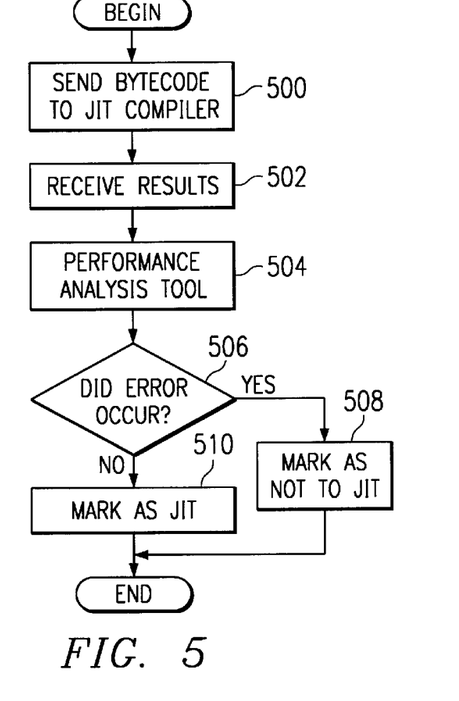
FIG. 5 is a flowchart of a process for analyzing bytecodes in accordance with a preferred embodiment of the present invention.

Turning next to FIG. 5, a flowchart of a process for analyzing bytecodes is depicted in accordance with a preferred embodiment of the present invention. This process is used to analyze the performance of a just in time compiler for use in compiling the bytecodes. The process begins by sending the bytecodes to the just in time compiler (step 500). Errors may occur from JIT'ing JAVA bytecode. The process receives the results from the JIT compiler (step 502). These results are analyzed for errors or for performance by a performance analysis tool (step 504). Performance analysis tools include utilities such as "Optimize It", available from Intuitive Systems, Inc. 555 N. Mathilda Ave. Suite 22 Sunnyvale, Calif. 94086.

The criteria may be based on a number of factors depending on the implementation. Examples of factors are invalid or unpredictable results occurring from JIT'ing JAVA bytecodes, the number of repetitions the method or class is to be executed, the memory requirement for JIT'ed files versus unJIT'ed files, and the time required to JIT a specific method or class.

The process then determines whether to JIT compile or not to JIT compile based on criteria used to measure performance of the JIT compiling (step 506). If the JIT compiler provides better performance results, then the class or method is marked 'JIT' (step 510) with the process terminating thereafter. Otherwise, the class/method is marked 'no JIT' (step 508), with the process terminating.

These results are then transferred to a class and method list in a JAR file by the software developer along with the application or applet in which the method or class occurs. Therefore, whenever the application or applet is loaded by a JAVA Virtual Machine from a JAR file, the list of classes and methods, and associated JIT'ing selections, is passed by the class loader to the data structure.

It is important to note that while the present invention has been described in the context of a fully functioning data processing system, those of ordinary skill in the art will appreciate that the processes of the present invention are capable of being distributed in the form of a computer-readable medium of instructions and a variety of forms and that the present invention applies equally regardless of the particular type of signal-bearing media actually used to carry out the distribution. Examples of computer-readable media include recordable-type media such a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer on which the virtual machine is located. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process in a data processing system for executing bytecode, the process comprising the data processing system implemented steps of:

receiving bytecode and information related to the bytecode in a data structure, wherein the data structure is retrieved from a data storage facility in conjunction with the bytecode;

intercepting a call to just in time compile the byetecode;

accessing the information related to the bytecode;

determining whether or not to execute the call based on the information related to the bytecode; and responsive to a determination that the bytecode should not be compiled, sending the bytecode to an interpreter.

2. The process of claim 1, wherein the data structure is contained in a JAVA archive file.

3. The process of claim 2, wherein the information related to the bytecode is based on criteria for whether or not to compile the bytecode.

4. The process of claim 3, wherein the criteria include a speed of compilation by a just in time compiler.

5. The process of claim 3, wherein the criteria include a size of code generated by a just in time compiler.

6. The process of claim 3, wherein the criteria include errors in compiling with a just in time compiler.

7. The process of claim 1, wherein the bytecode forms a method.

8. The process of claim 1, wherein the determining step comprises:

determining whether the execute the call using the information related to the bytecode;

responsive to a determination that the bytecode should be just in time compiled, executing the call; and compiling the bytecode.

9. The process of claim 1, wherein the bytecode and information related to a plurality of methods are stored in a JAVA archive file.

10. The process of claim 9, wherein a developer creates the JAVA archive file.

11. A process in a data processing system for executing bytecode, the process comprising:

storing bytecode in a JAVA archive file;

storing information related to a plurality of methods in the JAVA archive file;

accessing the information related to the plurality of methods in the JAVA archive file;

determining whether or not to compile the byteocde based on the bytecode to be compiled and on the information related to the plurality of methods; and responsive to a determination that they bytecode should not be compiled, sending the bytecode to an interpreter.

12. A process in a data processing system for executing bytecode, the process comprising:

storing bytecode in a JAVA archive file;

storing compiling information related to a plurality of methods in the JAVA archive file;

using the compiling information to determine whether or not to compile the bytecode; and responsive to a determination that the bytecode should not be compiled, sending the bytecode to an interpreter.

13. A process of claim 12, wherein the step of storing compiling information further comprises:

including the compiling information in a directory with a class file.

14. A process of claim 12, wherein the step of storing compiling information further comprises:

entering the compiling information in a manifest file.

15. A process of claim 12, wherein the step of storing compiling information further comprises:

storing a link to the compiling information in an extended class file.

16. A data processing system for executing bytecode, the process comprising the data processing system implemented steps of:

receiving means for receiving bytecode and information related to the bytecode in a data structure, wherein the data structure is retrieved from a data storage facility in conjunction with the bytecode;

intercepting means for intercepting a call to just in time compile the bytecode;

accessing means for accessing the information related to the bytecode;

determining means for determining whether or not to execute the call based on the information related to the bytecode; and sending means, responsive to a determination that the bytecode should not be compiled, for sending the bytecode to an interpreter.

17. The data processing system process of claim 16, wherein the data structure is contained in a JAVA archive file.

18. The data processing system of claim 17, wherein the information related to the bytecode is based on criteria for whether or not to compile the bytecode.

19. The data processing system of claim 18, wherein the criteria include a speed of compilation by a just in time compiler.

20. The data processing system of claim 18, wherein the criteria include a size of code generated by a just in time compiler.

21. The data processing system of claim 18, wherein the criteria include errors in compiling with a just in time compiler.

22. The data processing system of claim 16, wherein the bytecode forms a method.

23. The data processing system of claim 16, wherein the determining means for determining comprises:

determining means for determining whether the execute the call using the information related to the bytecode;

responsive to a determination that the bytecode should be just in time compiled, executing the call; and compiling means for compiling the bytecode.

24. The data processing system of claim 16, wherein the bytecode and information related to a plurality of methods are stored in a JAVA archive file.

25. The data processing system of claim 24, wherein the developer creates the JAVA archive file.

26. A data processing system for executing bytecode, the process comprising:

storing means for storing bytecode in a JAVA archive (JAR) file;

storing means for storing information related to a plurality of methods in the JAVA archive file;

accessing means for accessing the information related to the plurality of methods in the JAVA archive file;

determining means for determining whether or not to compile the bytecode based on the bytecode to be compiled and the on the information related to the plurality of methods; and sending means, responsive to a determination that the bytecode should not be compiled, for sending the bytecode to an interpreter.

27. A data processing system for executing bytecode, the process comprising:

storing means for storing bytecode in a JAVA archive file;

storing means for storing compiling information related to a plurality of methods in the JAVA archive file;

using means for using the compiling information to determine whether or not to compile the bytecode; and sending means, responsive to a determination that the bytecode should not be compiled, for sending the bytecode to an interpreter.

28. A data processing system of claim 27, wherein the storing means for storing compiling information further comprises:

including the compiling information in a directory with a class file.

29. A data processing system of claim 27, wherein the storing means for storing compiling information further comprises:

entering the compiling information in a manifest file.

30. A data processing system of claim 27, wherein the storing means for storing compiling information further comprises:

storing a link to the compiling information in an extended class file.

31. A computer program product processed in data processing system including instructions for executing bytecode, the instructions embodied on a computer readable medium and comprising:

instructions for receiving bytecode and information related to the bytecode in a data structure, wherein the data structure is retrieved from a data storage facility in conjunction with bytecode;

instructions for intercepting a call to just in time compile the bytecode;

instructions for accessing the information related to the bytecode;

instructions for determining whether or not to execute the call based on the information related to the bytecode; and instructions responsive to a determination that the bytecode should not be compiled, for sending the bytecode to an interpreter.

32. The computer program product of claim 31, wherein the data structure is contained in a JAVA archive file.

33. The computer program product of claim 32, wherein the information related to the bytecode is based on criteria for whether or not to compile the bytecode.

34. The computer program product of claim 33, wherein the criteria include a speed of compilation by a just in time compiler.

35. The computer program product of claim 33, wherein the criteria include a size of code generated by a just in time compiler.

36. The computer program product of claim 33, wherein the criteria include errors in compiling with a just in time compiler.

37. The computer program product of claim 31, wherein the bytecode forms a method.

38. The computer program product of claim 31, wherein the instructions for determining comprise:

instructions for determining whether the execute the call using the information related to the bytecode;

instructions, responsive to a determination that the bytecode should be just in time compiled, for executing the call; and instructions for compiling the bytecode.

39. The computer program product of claim 31, wherein the bytecode and information related to a plurality of methods are stored in a JAVA archive file.

40. The computer program product of claim 39, wherein the developer creates the JAVA archive file.

41. A computer program product processed in data processing system including instructions for executing bytecode, the instructions embodied on a computer readable medium and comprising:

instructions for storing bytecode in a JAVA archive file;

instructions for storing information related to a plurality of methods in the JAVA archive file;

instructions for accessing the information related to the plurality of methods in the JAVA archive file;

instructions for determining whether or not to compile the bytecode based on the bytecode to be compiled and the on the information related to the plurality of methods; and instructions responsive to a determination that the bytecode should not be compiled, for sending the bytecode to an interpreter.

42. A computer program product processed in data processing system including instructions for executing bytecode, the instructions embodied on a computer readable medium and comprising:

instructions for storing bytecode in a JAVA archive file;

instructions for storing compiling information related to a plurality of methods in the JAVA archive file;

instructions for using the compiling information to determine whether or not to compile the bytecode; and instructions responsive to a determination that the bytecode should not be compiled, for sending the bytecode to an interpreter.

43. A computer program product of claim 42, wherein the step of storing compiling information further comprises:

including the compiling information in a directory with a class file.

44. A computer program product of claim 42, wherein the step of storing compiling information further comprises:

entering the compiling information in a manifest file.

45. A computer program product of claim 42, wherein the step of storing compiling information further comprises:

storing a link to the compiling information in an extended class file.

* * * * *